(12) United States Patent
Gruber et al.

(10) Patent No.: US 10,876,628 B2
(45) Date of Patent: Dec. 29, 2020

(54) PARKING LOCK UNIT AND ELECTRIC DRIVE ASSEMBLY HAVING A PARKING LOCK

(71) Applicant: GKN Driveline Bruneck AG, Bruneck (IT)

(72) Inventors: Ivan Gruber, Schabs (IT); Manuel Ucar, Zirl (AT); Klaus Wagger, Bruneck (IT)

(73) Assignee: GKN Driveline Bruneck AG, Bruneck (IT)

( * ) Notice: Subject to any disclaimer, the term of this patent is extended or adjusted under 35 U.S.C. 154(b) by 34 days.

(21) Appl. No.: 16/313,171

(22) PCT Filed: Jun. 29, 2016

(86) PCT No.: PCT/EP2016/065185
§ 371 (c)(1),
(2) Date: Dec. 26, 2018

(87) PCT Pub. No.: WO2018/001476
PCT Pub. Date: Jan. 4, 2018

(65) Prior Publication Data
US 2019/0154149 A1 May 23, 2019

(51) Int. Cl.
*F16H 63/34* (2006.01)
*B60T 1/00* (2006.01)
(Continued)

(52) U.S. Cl.
CPC ........... *F16H 63/3458* (2013.01); *B60K 1/00* (2013.01); *B60T 1/005* (2013.01); *B60T 1/062* (2013.01);
(Continued)

(58) Field of Classification Search
None
See application file for complete search history.

(56) References Cited

U.S. PATENT DOCUMENTS 5,743,348 A * 4/1998 Coppola .................. B60K 1/00
180/65.6
6,692,394 B2 * 2/2004 Takenaka ................. B60K 6/36
180/65.6
(Continued)

FOREIGN PATENT DOCUMENTS

DE          15 30 587 B      1/1970
DE    10 2009 023498 A1    12/2010
(Continued)

OTHER PUBLICATIONS

International Search Report and Written Opinion for PCT/EP2016/065185 dated Mar. 27, 2017 (14 pages; with English translation).

*Primary Examiner* — Charles A Fox
*Assistant Examiner* — Ryan P Dodd
(74) *Attorney, Agent, or Firm* — Bejin Bieneman PLC (57) ABSTRACT

An electric drive assembly comprises a parking lock housing, a sleeve-shaped shaft journal supported in the parking lock housing so as to be rotatable around a rotational axis, wherein the shaft journal comprises a connecting profile for connection to the driveshaft of the electric drive assembly in a rotationally fixed way; a ratchet wheel connected to the shaft journal in a rotationally fixed way and received in a receiving space between the base portion and the cover portion; a locking element movably supported in the parking lock housing and that can be transferred into a locking position for blocking the ratchet wheel and into a releasing position for releasing the ratchet wheel; and a controllable actuator for actuating the locking element; wherein an inner diameter of the parking lock housing in the region of the ratchet wheel substantially corresponds to a greatest outer diameter of the ratchet wheel.

15 Claims, 5 Drawing Sheets

(51) Int. Cl.
   B60T 1/06  (2006.01)
   F16D 63/00  (2006.01)
   B60K 1/00  (2006.01)

(52) U.S. Cl.
   CPC ........... F16D 63/006 (2013.01); F16H 63/34 (2013.01); F16H 63/3416 (2013.01); B60K 2001/001 (2013.01); F16H 63/3466 (2013.01)

(56) References Cited

U.S. PATENT DOCUMENTS

| | | | | |
|---|---|---|---|---|
| 8,490,770 | B2* | 7/2013 | Schwekutsch | F16H 63/3416 192/219.5 |
| 8,840,506 | B2* | 9/2014 | Schwekutsch | B60T 13/746 180/65.6 |
| 2009/0127954 | A1* | 5/2009 | Mogi | B60K 17/12 310/90 |
| 2011/0203898 | A1 | 8/2011 | Harashima et al. | |
| 2011/0207570 | A1* | 8/2011 | Tanaka | B60K 1/00 475/150 |
| 2013/0019707 | A1* | 1/2013 | Ebihara | B60K 7/0007 74/468 |
| 2013/0303327 | A1* | 11/2013 | Pichler | B60T 1/005 475/224 |
| 2015/0160684 | A1* | 6/2015 | Valler | F16H 63/3425 192/218 |
| 2018/0076687 | A1* | 3/2018 | Pritchard | B60K 7/0007 |
| 2018/0363755 | A1* | 12/2018 | Wakui | B60T 1/005 |
| 2020/0040992 | A1* | 2/2020 | Tamura | B60T 1/06 |

FOREIGN PATENT DOCUMENTS

| | | |
|---|---|---|
| DE | 10 2011 015 691 A1 | 10/2012 |
| DE | 10 2013 208 976 A1 | 12/2014 |
| DE | 10 2014 219 341 A1 | 3/2016 |
| JP | 2009-121549 A | 6/2009 |
| JP | 2014-084950 A | 5/2014 |

* cited by examiner

PARKING LOCK UNIT AND ELECTRIC DRIVE ASSEMBLY HAVING A PARKING LOCK

CROSS-REFERENCE TO RELATED APPLICATIONS

This application is a national stage of, and claims priority to, Patent Cooperation Treaty Application No. PCT/EP2016/065185, filed on Jun. 29, 2016, which application is hereby incorporated herein by reference in its entirety.

BACKGROUND

Parking locks are used in drivelines of motor vehicles to optionally block a drive component in the driveline, so that the motor vehicle is prevented from unintentionally rolling away if an electric machine does not provide any torque. A parking lock can comprise a locking wheel connected to a drive component of the driveline, a locking element cooperating with the locking wheel, and an actuator for operating the locking wheel. The locking element can be moved into a closed position in which the locking element blocks the locking wheel and into a release position in which the locking elements releases the locking wheel by operating the actuator accordingly.

From DE 10 2009 023 498 A1 an electric drive assembly is known having an electric motor, a spur gearing and a differential gearing. A parking lock assembly is provided to inhibit a rotational movement of a driveshaft of the assembly, so that the motor vehicle is prevented from unintentionally rolling away. The parking lock assembly comprises a locking mechanism having a locking pawl and having a ratchet wheel as well as an electro-magnetic actuator for operating the locking mechanism. The ratchet wheel is connected to an intermediate shaft of the spur gearing, which intermediate shaft is arranged at an radial offset between the drive axis of the electric motor and the rotational axis of the differential gearing.

From DE 10 2014 219 341 A1 a parking lock assembly for a driveline of a motor vehicle is known. The parking lock assembly comprises a locking mechanism having a latch and an actuator. The actuator acts directly on the latch to move the latch from the closed position into the release position.

From US 2011/0203898 A1 there is known an electric drive assembly having an electric machine as drive source, a reduction gearing downstream in the power path, which translates a rotary motion introduced from the electric machine from high speed to slow speed, as well as differential gearing which distributes a torque introduced by the reduction gearing to two output shafts. An intermediate shaft is provided between the electric machine and the reduction gearing for torque transmission. The intermediate shaft is provided with a parking lock wheel which can block the driveline if required.

From DE 10 2013 208 976 A1 an electric drive device with an electric motor and a transmission device is known. A mechanical parking lock can be integrated into the electric motor.

SUMMARY

Disclosed herein is a parking lock for an electric drive assembly for driving a motor vehicle, as well as an electric drive assembly having an electric machine as a driving source and a parking lock. The parking lock can be easily integrated into the electric drive in terms of its design and enables simple assembly, respectively, and contributes to a compact design. An electric drive assembly with a parking lock, can be easily and compactly integrated into the driveline of the electric drive assembly.

A parking lock unit for an electric drive assembly for driving a motor vehicle comprises: a parking lock housing which comprises a base portion with a first bearing receptacle and, at a base end, connecting elements for connecting the parking lock housing to a housing of the electric drive assembly; a sleeve-shaped shaft journal which is rotatably supported in the first bearing receptacle about a rotational axis, wherein the shaft journal comprises a connecting profile for being connected to a driveshaft of the electric drive assembly; a ratchet wheel which is connected to the shaft journal in a rotationally fixed way and which is received in a receiving space between the base portion and the cover portion; a locking element which is movably supported in the parking lock housing and which is transferable into a locking position in which the locking element blocks a rotational movement of the ratchet wheel, and into a releasing position in which the locking element releases the ratchet wheel, so that the ratchet wheel and the driveshaft connected thereto are freely rotatable; a controllable actuator connected to the parking lock housing and configured to selectively transfer the locking element into the locking position or into the releasing position; wherein a smallest inner diameter of the parking lock housing in the region of the ratchet wheel substantially corresponds to the largest outer diameter of the ratchet wheel.

Advantageously, the parking lock unit has a simple design and can be easily mounted as a unit to a separately provided electric drive. In this case, the effort to adapt to an existing electric drive that does not have a parking lock, is low. It is particularly advantageous that an electric drive, with and without a parking lock, can be produced on one production line. The electric drive can be produced in identical versions for both options. For applications which require a parking lock, the parking lock can be flanged to the electric drive as an assembly unit. In this context, the term "assembly unit" refers to a pre-assembled, functional unit with captive parts (parts that cannot be lost). The parking lock unit can also be referred to as a parking lock module.

The parking lock unit comprises two interfaces, i.e. the connecting elements for attaching the parking lock unit to the housing of the electric drive and the connecting profile of the shaft journal for connecting the ratchet wheel to a driveshaft of the electric drive in a rotationally fixed way. The shaft journal can be rotationally fixedly connected to the driveshaft of the electric drive in particular by a plug-in connection, for example by shaft splines. The connection of the parking lock housing to the housing of the electric drive can be effected for example by means of flanged and/or bolted connection.

Depending on the design of the respective electric drive and the given installation space, the parking lock unit can in principle be attached at different points of the electric drive. In particular, the parking lock unit can be arranged coaxially relative to the motor shaft. However, it is to be understood that the parking lock unit can also be arranged on other driveshafts of the electric drive, for example in coaxial arrangement with a transmission shaft. The modular design of the parking lock permits a large number of applications, with the adaptation effort to existing electric drives being low.

A compact design of the parking lock unit is achieved in that the inner diameter of the parking lock housing in the region of the ratchet wheel substantially corresponds to the outer diameter of the ratchet wheel. This means that the diameter of the housing is substantially orientated to the diameter of the ratchet wheel. A radial gap is formed between the ratchet wheel and the inner wall of the housing so that the ratchet wheel can rotate freely in the housing. To achieve a compact radial arrangement, it proposed possible in particular that the inner diameter of the parking lock housing in the region of the ratchet wheel is smaller than 1.3 times the outer diameter of the ratchet wheel, preferably smaller than 1.2 times the outer diameter of the ratchet wheel. Furthermore, the parking lock housing can have an axial length which is smaller than 1.5 times the axial length of the shaft journal.

The shaft journal, which is to be connected to a driveshaft of the electric drive, serves essentially to connect the ratchet wheel with the driveshaft. The shaft journal does not transmit any torque to other components. In other words, the shaft journal comprises, for torque introduction, only the connecting profile for the rotationally fixed connection with the output shaft of the electric drive assembly and the connection with the ratchet wheel.

The parking lock housing can comprise a cover portion which delimits and/or closes the receiving space, in which the ratchet wheel is accommodated, to the outside. In one embodiment, the cover portion can be designed as a closed cover. According to another embodiment, the cover portion can comprise a second bearing receptacle for an output shaft of the differential gearing. This embodiment is used if the ratchet wheel is arranged coaxially relative to the motor shaft and to the output shaft. According to a possible arrangement, the cover-facing end of the shaft journal can extend axially into the through-bore of the cover portion. In this way, lubricant that flows along the inside of the shaft journal can reach the bearing region of the output shaft in the cover portion for lubricating same.

According to an exemplary embodiment, the parking lock assembly can comprise an axially movable operating member that can be moved by the actuator in a first axial direction and which is loaded by spring means in a second direction that is opposed to the first direction. The operating member cooperates with the locking element in particular in such a way, that when being moved in the first axial direction the operating member releases the locking element, and when being moved in the second direction the operating member loads the locking element into the closed position. In the closed position the locking element form-lockingly engages the ratchet wheel, so that the ratchet wheel and the driveline connected thereto are blocked. In the released condition the ratchet wheel can rotate freely so that a rotational movement introduced by the electric motor is transmitted to the driveline.

The locking element can be designed, according to a first possibility, in the form of a pivotally movable locking pawl or, according to a second possibility, in the form of a linearly movable locking bolt. Spring means may be provided to load the locking element towards the release position. The locking element comprises engaging means which are configured so as to form-lockingly engage or disengage, respectively, the contour of the ratchet wheel.

Further disclosed is an electric drive assembly comprising: a housing assembly; an electric machine with a motor shaft in the form of a hollow shaft which is rotatably drivable around a rotational axis; a reduction gearing which is configured to transmit a torque introduced by the motor shaft into slow speed, wherein the reduction gearing comprises a transmission shaft which is offset relative to the motor shaft; a differential gearing with a differential carrier and two output gears, wherein the differential gearing is configured to transmit a rotational movement introduced from the reduction gearing to the differential carrier to two output gears; a parking lock unit with a ratchet wheel, a locking element and a controllable actuator, wherein the ratchet wheel is arranged coaxially relative to the rotational axis and is connected to the motor shaft in a rotational fixed way, wherein the locking element cooperates with the ratchet wheel and is controllable by the actuator in the closing sense in order to inhibit a rotational movement of the ratchet wheel and is controllable in the opening sense in order to release the ratchet wheel; wherein the differential gearing and the parking lock unit are arranged on opposed sides of the electric motor.

The electric drive assembly offers the advantage that the electric motor on the one hand and the reduction gearing on the other hand are arranged particularly closely to each other. In particular, the motor shaft and the transmission shaft can be arranged with an axial overlap to each other. This results in a particularly compact design in this central region of the electric drive between the electric motor and the reduction gearing. A further advantage is achieved, as already described above, in that the parking lock unit can be configured as a modular unit that can be attached easily to the motor side of the electric drive.

At an end opposite to the differential gearing, the first housing part for the electric machine can comprise a base portion with a central opening through which the motor shaft of the electric machine extends. Thus, a free end of the motor shaft is positioned outside the housing portion in which the electric machine is received. In one embodiment, the parking lock assembly can comprise a parking lock housing with a connecting portion, wherein for mounting purposes the parking lock assembly can be placed from the outside on to the base portion of the motor housing, wherein the shaft journal of the parking lock assembly is rotationally fixedly connectable to the hollow shaft of the electric machine and wherein the connecting portion of the parking lock housing is attachable to the base portion of the motor housing. In the mounted condition, the parking lock housing is rigidly connected to the motor housing and the shaft journal of the parking lock unit is connected to the motor shaft of the electric motor in a rotationally fixed way. The shaft journal of the parking lock unit can be rotationally fixedly connected to the motor shaft of the electric machine for example via a plug-in connection. For this purpose, the shaft journal can comprise a shaft toothing (splines) which engage a corresponding shaft toothing of the motor shaft in a rotationally fixed manner.

The parking lock housing can comprise a cover portion with a central through opening, wherein, in the cover portion, a shaft bearing is provided for rotatably supporting an output shaft connected to the differential gearing. The output shaft can comprise a second end portion which is remote from the differential gearing and which is rotatably supported about the axis of rotation in a shaft bearing in the cover portion, with the motor shaft and/or the shaft journal connected thereto axially extending into the cover portion of the parking lock housing. This design allows lubricant to pass from the gearing side through the motor shaft formed as hollow shaft to the region of the shaft bearings of the output shaft, which are arranged remote from the differential gearing in the cover portion to lubricating same.

According to a possible configuration, the electric drive assembly can comprise a rotary pulse encoder for sensing a rotational position of the electric machine, wherein the rotary pulse encoder is arranged in particular in an annular receiving chamber formed between the base portion of the first housing part and the base portion of the parking lock assembly.

According to an embodiment, the housing assembly can comprise a second housing part which contains the differential gearing, as well an intermediate wall which is arranged between the first housing part and the second housing part. The intermediate wall can comprise a first bearing receptacle for receiving a first shaft bearing for the motor shaft, as well as a second bearing receptacle for receiving a second shaft bearing for the transmission shaft. Specifically, it is possible that the hollow shaft comprises a shaft portion connected to a rotor of the electric machine, a bearing portion rotatably supported in the intermediate wall and an input gear, wherein the input gear projects freely into a receiving space formed behind the intermediate wall. Consequently, only one shaft bearing is provided at the transmission end of the motor shaft, so that the electric motor and the transmission unit can be arranged close to one another, which leads overall to an axially compact design in this central area of the electric drive assembly.

In a further configuration, the housing assembly can comprise an intermediate plate which is arranged between the intermediate wall and the second housing portion. Furthermore, between the hollow motor shaft and the output shaft of the differential gearing extending therethrough, an annular channel is formed having a first mouth facing the differential gearing and a second mouth arranged remote from the differential gearing. The intermediate plate of the housing assembly can comprise a through opening through which the output shaft extends, wherein an annular gap is formed between the output shaft and the intermediate plate through which lubricant can flow from the receiving space of the differential gearing into the annular channel. The intermediate plate can comprise a lubricant guiding geometry which is configured to direct lubricant to a mouth region of the first mouth of the annular channel so that the lubricant can flow through the annular channel towards the second mouth.

In particular, as described above, the parking lock unit can be configured as a pre-mountable unit which, with the ratchet wheel and the motor shaft being coaxially arranged, can be axially mounted from the outside on the housing part in which the electric machine is received, and connected thereto. It is to be understood that the parking lock unit can comprise one or more of the above designs.

An electric drive assembly having a parking lock unit as described herein offers analogously the same advantages as described above in connection with the parking lock unit, to which it is referred to in abbreviated form. In particular, as a pre-assembled unit, the parking lock unit can be easily connected to the electric drive. For this purpose, two defined interfaces are provided, i.e. the shaft connection and the housing connection, with which the two units are functionally and physically connected to each other.

SUMMARY OF THE DRAWINGS

Example embodiments are described below with reference to the drawings, wherein.

DESCRIPTION

FIGS. 1 to 5, which are described jointly below, show a parking lock unit 2 for the driveline of a motor vehicle in a first embodiment. In general, a parking lock serves for optionally blocking a drive component in the driveline of a motor vehicle, so that the motor vehicle is prevented from unintentionally rolling away if the drive source does not provide any torque.

The present parking lock is modular, i.e. it can be a pre-assembled unit which can be connected to an electric drive. The parking lock unit 2, which can also be referred to as parking lock module, comprises a parking lock housing 3, a sleeve-shaped shaft journal 4 which is supported in the parking lock housing 3 so as to be rotatable around a rotational axis A4, a ratchet wheel 5 which is connected to the shaft journal 4 in a rotationally fixed way, a locking element 6 which is movably supported in the parking lock housing 3, and a controllable actuator 7 for operating the locking element 6.

The parking lock housing 3 is substantially cup-shaped and comprises a base portion 8 with a through opening 9. A wall region of the base portion 8 which surrounds the through opening 9 forms a bearing receptacle 10 for the shaft bearing 12 in which the sleeve-shaped shaft journal 4 is rotatably supported. In the present embodiment, the shaft bearing 12 is provided in the form of a rolling-contact bearing, in particular a ball bearing, without being restricted thereto. At the end opposite the base portion 8, the parking lock housing 3 has a cover portion 13 which axially delimits a receiving space 11 of the parking lock, in which the ratchet wheel 5 is received, to the outside.

In the present embodiment the cover portion 13 comprises a through opening 14, wherein a sleeve portion surrounding the through opening comprises a bearing receptacle 15 for an output shaft of the electric drive. A shaft bearing 15 for an output shaft (not shown) of the electric drive is arranged in the bearing receptacle 15. Furthermore, a shaft sealing ring 17 which seals the annular space formed between the output shaft and the cover 13, can be seen in particular in FIGS. 1 and 2. The shaft sealing ring 17 prevents lubricant escaping from the parking lock assembly into the environment and undesirable foreign substances from the environment from entering the parking lock assembly.

Figures 1, 2, 3:
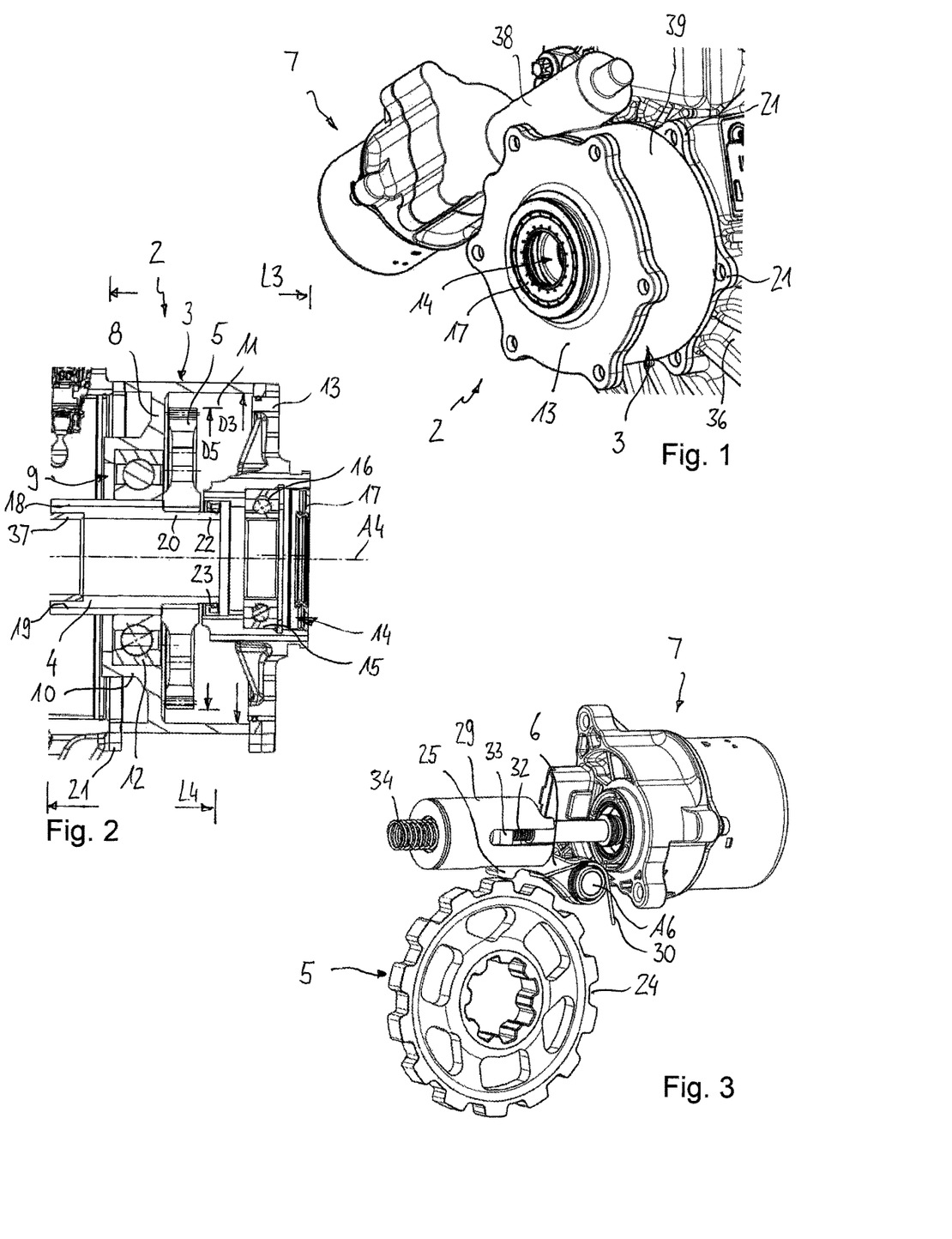
FIG. 1 shows an example parking lock unit in a perspective view.
FIG. 2 shows the parking lock unit according to FIG. 1 in a longitudinal section.
FIG. 3 shows the parking lock unit according to FIG. 1 without the housing in a perspective view.

The shaft journal 4 is provided in the form of a short hollow shaft and serves as a connecting member for connecting the ratchet wheel 5 to a driveshaft of the electric drive (not shown here). The shaft journal 4 extends from the interior 11 of the parking lock housing 3 through the base portion 8 to the outside. The shaft journal 4 comprises in particular at a first end 18 connecting means 19 which are configured in such a way that they can be connected with corresponding connecting means of the driveshaft. The connecting means 19 can be designed, for example, as shaft splines or any other suitable form-engaging means. The ratchet wheel 5 is connected to a portion 20 of the shaft journal 4 arranged in the housing 3 by means of suitable connecting elements 21. For example, the connection can be effected by a form-locking connection, in particular by splines, wherein other connecting forms such as a force-locking connection, for instance a press connection, and/or a material-locking connection, for instance a welded connection, as well as a one-piece design of the ratchet wheel 5 and the shaft journal 4 are also conceivable. The end 22 of the shaft journal 4 which is arranged in the receiving chamber 11 and points towards the cover 13 respectively, extends axially into the through opening 14 of the cover 13. This means that the shaft end 22 partially axially overlaps with the sleeve portion of the cover 13. This enables lubricant contained inside the shaft journal 4 to reach the shaft bearing 16 in order to lubricating same. An annular space is formed between an outer circumferential face of the end portion 22 and an inner circumferential face of the cover portion, in which annular space a shaft seal 23 is arranged.

Figure 4:
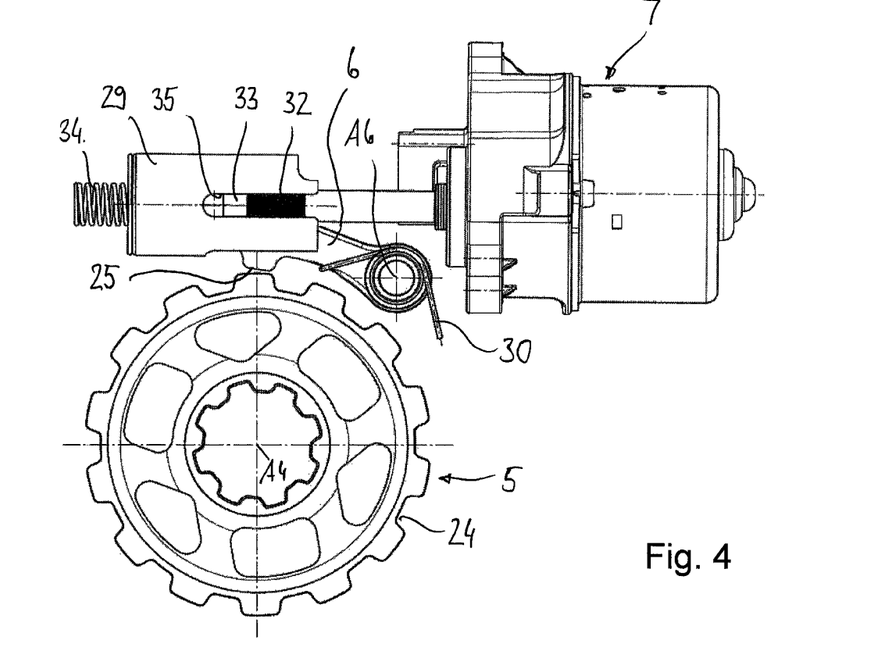
FIG. 4 shows the parking lock unit according FIG. 1 without the housing in an axial view.
Figure 5:
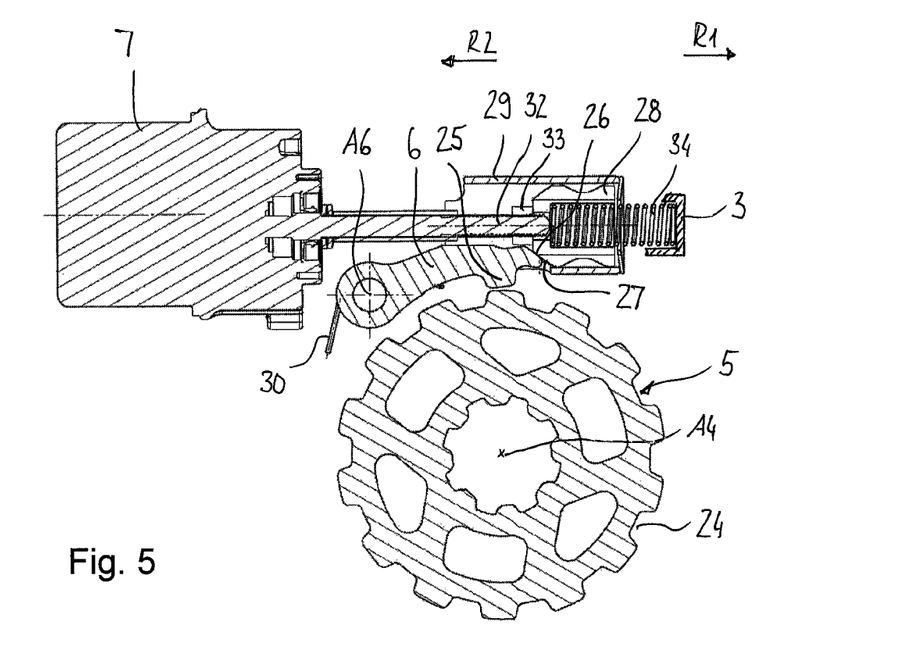
FIG. 5 shows the parking lock unit according to FIG. 1 without the housing in a cross-sectional view.

As can be seen in particular in FIGS. 3 to 5, the ratchet wheel 5 has on an outer circumferential face a plurality of circumferentially distributed engagement recesses 24, into which the locking element 6 can engage with a locking tooth 25 in a form-locking manner. The locking element 6 can be transferred into a locking position in which it is form-lockingly connected to the ratchet wheel 5 so that the ratchet wheel 5 is prevented from carrying out a rotational movement. In its disengaged position, the locking element 6 is pivoted outwardly relative to the ratchet wheel 5, so that the ratchet wheel 5, and thus the output shaft of the electric drive, are freely rotatable.

The locking element 6 is designed in the form of a locking pawl 6 which at one end is pivotably supported in the parking lock housing 3 around the pivot axis A6. The locking pawl 6 serves to optionally fix the ratchet wheel 5 and, respectively, the shaft journal 4 connected thereto, so that a driveshaft to be connected to the shaft journal 4 is prevented from carrying out a rotational movement, or to release the ratchet wheel so that the components of the driveline can rotate freely. For transferring the locking pawl 6 from the locking position into the releasing position, a spring element 30 is provided. The spring element 30 is designed in the form of a leg spring which is supported with a first leg on the parking lock housing 3, and with a second leg on the locking pawl 6.

At its opposite free end, the locking pawl comprises a functional face 26 on its outside which cooperates with a pressure face 27 of an operating member 28 which is operable by the actuator 7. The functional face 26 is inclined relative to a radial plane which contains the rotational axis A4 and which extends through the contact point between the functional face 26 and the pressure face 27. In this way, a translatory movement of the operating member 28 is translated into a pivot movement of the locking pawl 6. For guiding the operating member 28, a guiding sleeve 29 is provided in which the operating member 28 is axially movably guided.

In the present embodiment, the actuator 7 is configured as an electro-mechanical actuator which can be controlled by an electronic control unit (not shown). However, it is understood that, as an alternative, the actuator can also be provided in the form of an electro-magnetic hydraulic or pneumatic actuator. The actuator 7 acts on the operating member 28 in a first axial direction R1. For this purpose, the actuator 7 comprises a rotatably drivable spindle shaft 32 which cooperates with a spindle nut 33 threaded on to the spindle shaft 32. The spindle nut 33 acts as a stop and/or supporting face for the operating member 28. The operating member 28 is loaded by a spring 34 in the second direction R2, i.e., against the spindle nut 32.

By rotating the spindle shaft 32 in a first direction of rotation, the spindle nut 33 threaded onto the spindle shaft 32 moves into the first axial direction R1 away from the actuator 7. In the displaced position remote from the actuator, as shown in FIG. 5, the operating member 28 is displaced away from the functional face 26 of the locking pawl 6 against the pre-tensioning force of the spring 34, so that the locking pawl 6 is released and pivoted radially outwardly by the spring force of the spring element 30 relative to the locking wheel.

By rotating the spindle shaft 32 in the opposite second direction of rotation, the spindle nut 33 moves accordingly in the axially opposite second direction R2, i.e., towards the actuator 7. The operating element 28 is released and is loaded by the spring 34 towards the functional face 26 of the locking pawl 6. When the tooth 25 is located in the region of a gap of the ratchet wheel, the operating member 28 acts on the locking pawl 6 to provide closing and loads same radially inwardly. The tooth 25 form-lockingly engages one of the recesses 24 of the ratchet wheel 5 so that the latter cannot rotate. To release again, the spindle nut 33 is moved back into its first position. To prevent the spindle nut 33 from rotating when the spindle shaft 32 rotates, the spindle nut 33 is rotationally secured in a longitudinal groove 35 of the guiding sleeve 29. The spring 32 can be designed as a helical spring which is positioned in a receiving space of the operating member 28. The spring 32 is axially supported against the operating member 28 on one side and against the parking lock housing 3 on the other side.

As can be seen in particular in FIG. 1, the actuator 7 with the spindle mechanism 32, 33 as well as the locking mechanism 5, 6 form a common unit with a common housing. In particular, it is proposed that a housing portion 38 of the spindle mechanism 32, 33, to which the electromotive actuator is flanged, is firmly connected to a housing portion 39 of the locking mechanism 5, 6.

The parking lock unit 2 can also comprise a locking sensor which detects the switching position of the locking member 6 and passes on a respective locking signal to the electronic control unit. The locking sensor which can be fixed in the parking lock housing 3 senses whether the locking element 6 form-lockingly engages the ratchet wheel 5, whether it is in tooth-on-tooth position or whether it is fully pivoted away from the ratchet wheel 5.

For connection to an electric drive, the parking lock unit 2 comprises two interfaces, i.e., the connecting elements 21 for connecting the parking lock housing 3 to the housing 36 of the electric drive, as well as the connecting profile 19 of the shaft journal 4 for connecting the ratchet wheel 5 in a rotationally fixed manner to the driveshaft 37 of the electric drive. In the present embodiment, the parking lock housing 3 is connected to the housing of the electric drive by a flanged and/or bolted connection, without being restricted thereto.

It can be seen in particular in FIG. 2 that an inner diameter D3 of the parking lock housing 3 in the region of the ratchet wheel 5, in particular in axial overlap with the ratchet wheel 5, substantially corresponds to the outer diameter D5 of the ratchet wheel 5, i.e. it is only slightly greater than said outer diameter D5. In particular, the housing portion of the parking housing 3, which housing portion forms the receiving chamber 11 for the ratchet wheel 5 and respectively encloses same, comprises an inner diameter D3 which is smaller than 1.3 times, preferably smaller than 1.2 times, the outer diameter D5 of the ratchet wheel 5. The parking lock housing 3 can further have an axial length L3 which is smaller than 1.5 times the axial length L4 of the shaft journal 4. Overall, this arrangement of the parking lock unit provides a compact design and allows various applications.

Figure 6:
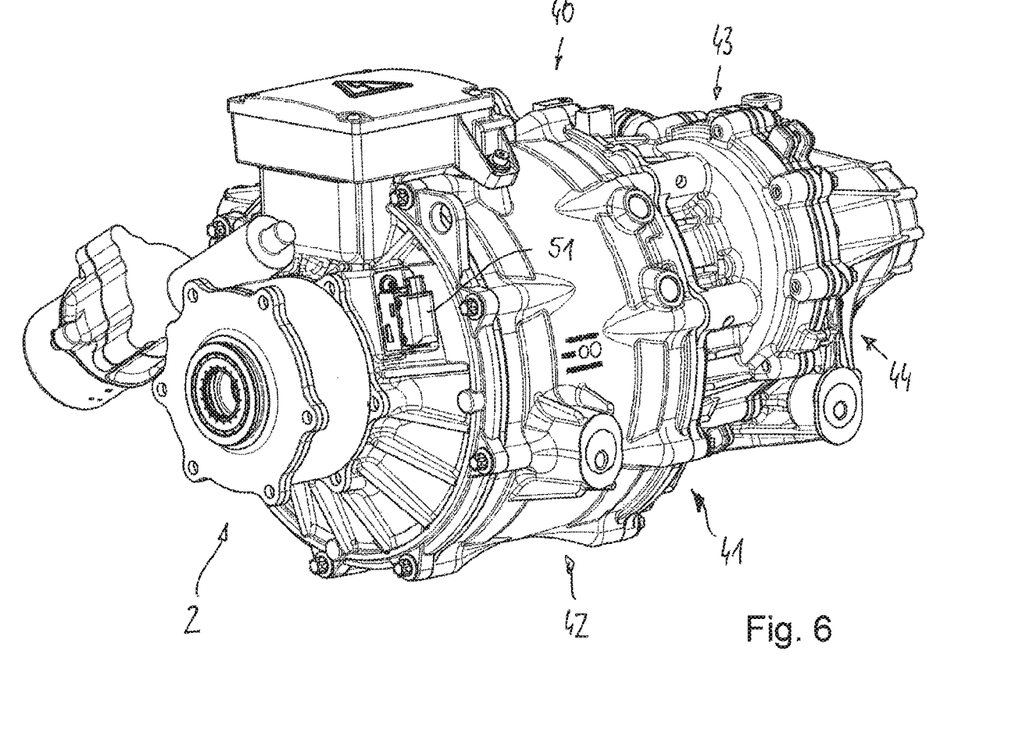
FIG. 6 shows an inventive electric drive assembly having a parking lock unit according to FIG. 1 in a perspective view.
Figure 7:
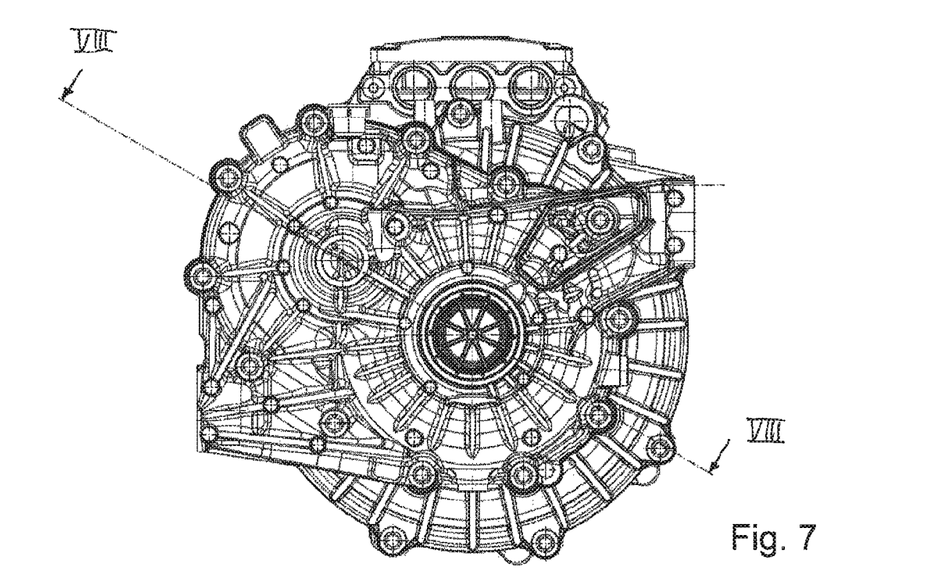
FIG. 7 shows the electric drive assembly according to FIG. 6 in an axial view of the differential gearing.
Figure 8:
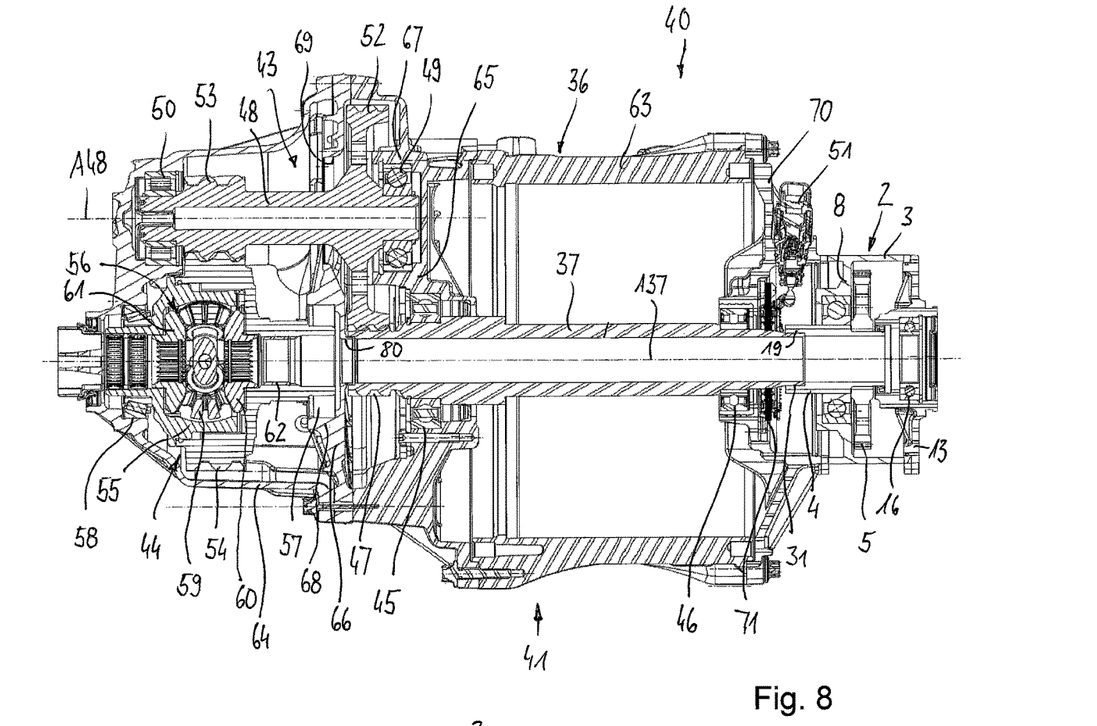
FIG. 8 shows the electric drive assembly according to FIG. 6 and FIG. 7 respectively in a longitudinal section along sectional lines VIII-VIII of FIG. 7.

FIGS. 6 to 8, which are described jointly below, show an electric drive having a parking lock unit 2 as per FIGS. 1 to 5. The electric drive 41 and the parking lock unit 2 jointly are also referred to as the electric drive assembly 40.

The electric drive 41 comprises an electric machine 42 and a reduction gearing 43 drivingly connected to the electric machine for transmitting torque, as well as a differential gearing 44 drivingly connected to the reduction gearing for transmitting torque.

The electric drive 41 is configured to drive a driving axle of a motor vehicle as the sole drive of this driving axle. A further driving axle of the motor vehicle can be driven by a further drive unit with a separate drive source, for example an internal combustion engine.

The electric machine 42 comprises a stator and a rotor which is rotatable relative thereto and which rotatingly drives a motor shaft 37 when the electric machine is energized. The rotational movement of the motor shaft 37 is transmitted, via the reduction gearing 43 following in the power path, to the differential gearing 44. The electric machine 42 is supplied with electric power by a battery (not shown). The electric machine 42 can be operated in motor mode, with electric energy being converted into mechanical energy for driving the driving axle, or in generator mode, where, conversely, mechanical energy is converted into electric energy which can then be stored in the battery. The electric drive 40 further comprises a housing assembly 36 in which the electric machine 42, the reduction gearing 43 and the differential gearing 44 are arranged.

The reduction gearing 43 is designed to translate a rotational movement introduced by the motor shaft 37 from fast to slow. Thus, an input part of the differential gearing 44 rotates many times slower than the motor shaft 37 of the electric machine 42. The differential gearing 44 distributes the introduced torque to two output shafts (not illustrated) which serve to drive an associated vehicle wheel. The motor shaft 37 is provided in the form of a hollow shaft and is rotatably supported about a rotational axis A37 in the housing assembly 36 of the electric drive 40 by means of first and a second bearings 45, 46, one or both of which can be referred to as a bearing portion of the motor shaft 37. A first input gear 47 (first gear) is connected to the driveshaft 37 in a rotationally fixed way, in particular so as to be integral therewith.

The reduction gearing 4 comprises a transmission shaft 48 which is rotatably supported in the housing assembly 36 via bearings 49, 50 about a second rotational axis A48 parallel to the first rotational axis A37, which transmission shaft 48 can also be referred to as an intermediate shaft. The transmission shaft 48 comprises second input gear 52 (second gear) and an output gear 53 (third gear) which are connected to the transmission shaft in a rotationally fixed way, in particular are designed in one piece therewith. The output gear 53 engages a ring gear 54 (fourth gear) for driving the differential gearing 44. The ring gear 54 is firmly connected to the input part 55 of the differential gearing 44 and can, for example, be designed in one piece therewith, with other types of connections such as a material-locking connection by means of welding and/or a force-locking connection by means of bolts also being possible. It is proposed in particular that the output gear 53 of the transmission shaft 48 and the ring gear 54 of the clutch input part comprise helical gears.

It can be seen that the reduction gearing 4 comprises exactly one transmission shaft 48 and two gear pairs. The input gear 47 of the motor shaft 37, and the input gear 52 of the transmission shaft 48 engaging same, form a first gear pair of the reduction gearing 5 with a first reduction ratio i1. The output gear 53 of the transmission shaft 48 and the ring gear 54 engaging same form a second gear pair with a second reduction ratio i2. The motor shaft input gear 47 comprises a substantially smaller diameter and, respectively, a smaller number of teeth than the diameter and number of teeth of the transmission shaft input gear 52. In this way, a transmission to slow speed is achieved. The transmission shaft output gear 53 also has a smaller diameter and, respectively, a smaller number of teeth than the ring gear 54, so that a further transmission into slow is effected.

In terms of design, the transmission shaft 48 is arranged relatively closely to the motor shaft 37 in radial direction. In particular, the radial distance formed between the rotational axis A48 of transmission shaft 48 and the rotational axis A37 of the motor shaft can be smaller than 0.9 times the greatest radius of the electric machine 42, in particular smaller than 0.8 times the radius. With this design, the transmission shaft 48 (without the input gear 18), in an axial view, is clearly arranged inside an envelope of the electric machine, so that overall there a radial compact design of the electric drive is achieved.

The differential gearing 44 comprises a differential cage 55 which is firmly connected to the ring gear 54 and is rotatingly drivable around the rotational axis A55 by the output gear 53, as well as a differential gear set 56 which is received in the differential cage 55. The differential cage 55 is supported in the housing assembly 36 by bearings 57, 58 so as to be rotatable about the axis of rotation A37. The differential cage 55 can be provided as two-piece assembly comprising a first housing part integral with the ring gear 54 and a second housing part, the two housing parts being firmly connected to each other. The two housing parts each comprise a sleeve projection by means of which they are rotatably received in the associated bearing 57, 58. The differential carrier 55 and the motor shaft 37 are arranged coaxially relative to one another, i.e., they comprise the same rotational axis A.

The differential carrier 55, which serves as an input part, accommodates a plurality of differential gears 59, which are rotatably supported on journals connected to the differential carrier 55 and jointly rotating therewith around the rotational axis A, and first and a second sideshaft gear 60, 61 as output parts, which are rotatingly drivable by the differential gears 59 around the rotational axis A. The first sideshaft gear 60 is to be connected in a rotationally fixed way to a first output shaft (not shown) which extends through the motor shaft 37 formed as hollow shaft.

The output shaft is rotatably supported at a transmission-side first portion by means of a bearing 62 in the sleeve projection of the differential carrier 55, and at a parking-lock-side second portion by means of the bearing 16 in the cover portion 13 of the parking lock housing 3 so as to be rotatable around the rotational axis A. At the end portion on the parking-lock-side, the output shaft can be connected to a constant velocity joint which serves to transmit torque to a sideshaft of the motor vehicle under angular movements. Like the first sideshaft gear 60, the second sideshaft gear 61 comprises shaft splines into which a shaft journal of a second output shaft can be inserted in a rotationally fixed manner to drive a second sideshaft of the motor vehicle.

It can be seen in particular in FIG. 8 that the housing assembly 36 is composed of a plurality of individual housing parts. In particular, the housing assembly 36 comprises a first housing portion 63 in which the electric motor 42 is received, and a second housing portion 64 in which the differential gearing 44 is received, as well as a first intermediate wall 65 and a second intermediate wall 66 which are arranged between and fixedly connected to the first and the second housing portions 63, 64. The first intermediate wall 65 comprises a first bearing receiving portion in which the motor shaft 37 is supported by the bearing 45 so as to be rotatable around the rotational axis A, and a second bearing receiving portion 67 in which the transmission shaft 48 is supported by the bearing 49 so as to be rotatable around the rotational axis A48. To achieve a radially compact design, a radial distance between the first bearing receiving face and the second bearing receiving face may be smaller than 2.0 times the radial extension of the first and/or the second shaft bearing 45, 49.

Axially between the first intermediate wall 65 and the second intermediate wall 66 a receiving space is formed in which the input gears 47, 52 are received. The second intermediate wall 66 which is in particular narrower than the first intermediate wall 65 and can therefore also be referred to as an intermediate plate, comprises a bearing receiving portion 68 for the bearing 57 for rotatably supporting the differential carrier 55, as well as a through opening 69 through which the transmission shaft 48 is extends. The through opening 69 comprises an inner diameter which is greater than the outer diameter of the gear 53 so that the transmission shaft 48 with the gear 53 can be mounted through the opening 69.

At its end remote from the transmission unit 4, i.e. at the motor-side end, the housing assembly 36 comprises a base part 70 in which the bearing 46 for the motor shaft 37 is received. The motor shaft 37 extends through the base part 70 and at its end facing the parking lock comprises a connecting profile 31 which is configured so as to correspond to the connecting profile 19 of the shaft journal 4, so that the shaft journal 4 can be connected in a rotationally fixed way to the motor shaft 37. In an annular receiving chamber formed between the base portion 70 of the first housing part 36 and the base portion of the parking lock assembly 3 a rotary pulse encoder 71 is accommodated for sensing a rotational position of the electric machine 4. The electric connection 51 of the rotary pulse encoder is also visible.

A special feature of the present design is that the differential gearing 55 and the parking lock unit 3 are arranged on opposite sides of the electric motor 4. This has an advantageous effect in that the adaptation effort to an existing electric drive, which does not comprise a parking lock, is only low. In particular, the driveline between the motor shaft 37 and the differential gearing 44 can remain the same.

In applications in which a parking lock is required, the parking lock can be flanged to the electric drive. For this purpose, the parking lock 2—with the ratchet wheel 5 and the motor shaft 37 being arranged coaxially—is placed axially on the base part 70 of the electric drive and attached thereto via a bolted and/or flanged connection. A rotationally fixed connection is effected between the motor shaft 37 and the shaft journal 4, so that the parking lock gear 5 is attached to the motor shaft 37 and jointly rotates therewith and, respectively, blocks same when the parking lock 2 is in the closed position.

In the present embodiment, the parking lock unit 2 is arranged coaxially relative to the motor shaft 37 of the electric drive 41. However, other embodiments are also possible in which a parking lock unit 2 can be arranged at a different driveshaft of the electric drive.

Figure 9:
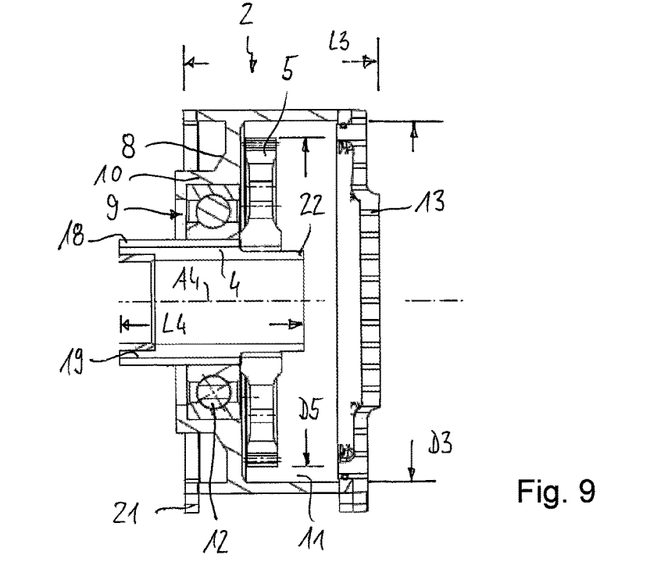
FIG. 9 shows a second example parking lock unit in a longitudinal section.

FIG. 9 shows in a longitudinal section a parking lock unit 2 in an embodiment that is slightly modified relative to embodiment according to FIGS. 1 to 5. The function and the mechanical structure are identical with the design shown in FIGS. 3 to 5 and will therefore not be described again. The embodiment according to FIG. 9 largely corresponds to that shown in FIGS. 1 to 5, so that as far as common features are concerned, reference is made to the above description. The same details are provided with the same reference signs as in FIGS. 1 to 5. The only difference of the embodiment according to FIG. 9 is that the cover portion 13 is configured as a closed cover, i.e. without a through opening.

Figure 10:
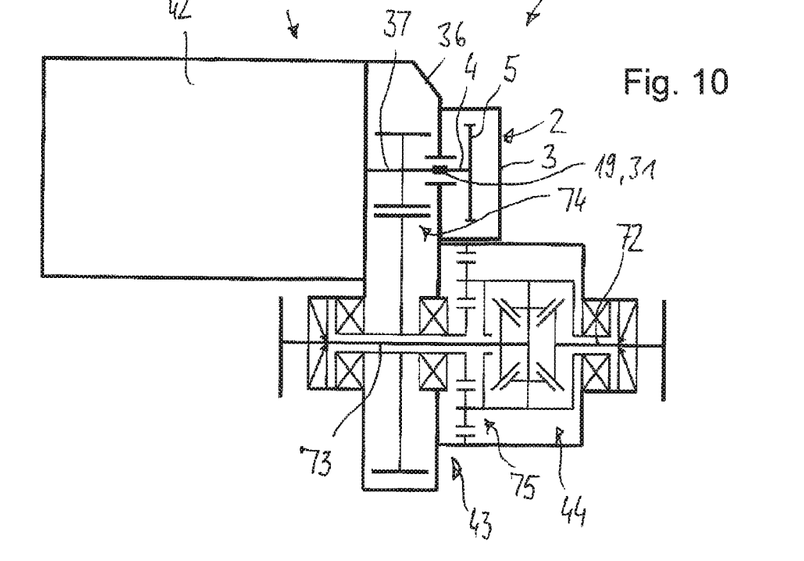
FIG. 10 schematically an electric drive assembly in a second example having a parking lock unit according to FIG. 9, and FIG. 11 schematically shows an electric drive assembly in a further example having a parking lock unit according to FIG. 9.

FIG. 10 schematically shows an electric drive in a further embodiment which, in respect of its functionality, is similar to that according to FIG. 8. Corresponding or similar details are therefore provided with the same reference signs as in FIG. 8.

The electric drive 41 comprises an electric motor 42, a transmission unit having a reduction gearing 43 and a differential gearing 44 which transmits a drive moment from the electric motor 42 to two output shafts 72, 73. The reduction gearing comprises two reduction stages, wherein a first one of which is formed by a spur gear unit 74 and a second one is formed by a planetary gear unit 75.

A parking lock unit 2 is provided which, in respect of design and function, corresponds to that shown in FIG. 9, so that abbreviated reference is made to the above description. The parking lock unit 2, just like the electric drive 41, is shown schematically only. The parking lock unit 2 is connected to the housing 36 in a coaxial arrangement to the motor shaft 37 of the electric drive 41. The mechanical connection of the housing parts can be effected for example by a bolted and/or flanged connection. The rotationally fixed connection 19, 31 between the shaft journal 4 of the parking lock unit 3 and the motor shaft 37 can be effected by a shaft toothing (splines).

Figure 11:
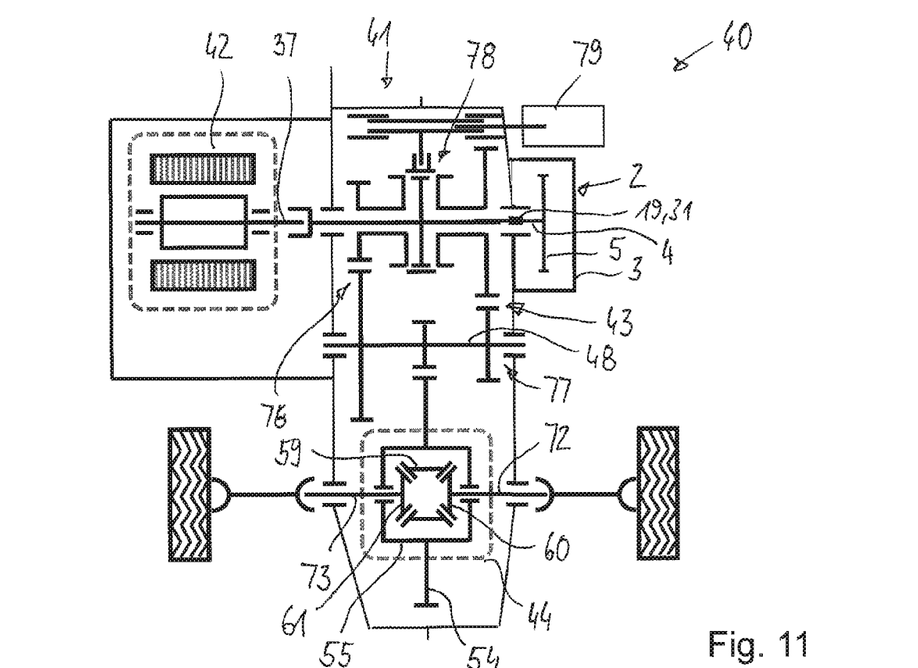

FIG. 11 shows an electric drive in a further embodiment which, in terms of function, is largely similar to the embodiment according to FIG. 10. Corresponding or similar details are therefore provided with the same reference signs as in FIG. 10 and FIGS. 8 and 9 respectively.

The electric drive 41 comprises an electric motor 42, a transmission unit with a reduction gearing 43 which translates a rotational movement introduced by the electric motor 42 from fast to slow, and a differential gearing 44 which transmits a driving torque from the electric motor 42 to two output shafts 72, 73. In the present embodiment, the reduction gearing is configured as a multi-step transmission with two gear stages 76, 77, so that a rotational movement introduced by the electric motor 42 can be transmitted to the differential gearing 44 at two different rotational speeds. For selectively shifting the multi-step transmission into the first gear stage 76 and the second gear stage 77 respectively, a clutch unit 78 is provided which can be operated by a controllable clutch actuator 79.

A parking lock unit 2 is provided which, in terms of design and function, corresponds to that according to FIG. 9, so that thus abbreviated reference is made to the above description. The parking lock unit 2, like the electric drive 41 is shown only schematically. The parking lock unit 2 is arranged coaxially relative to the motor shaft 36 of the electric motor 42 and is connected to the housing 37 of the electric drive 41. The mechanical connection of the housing parts can be effected for example by means of a flanged and/or bolted connection. The rotationally fixed connection between the shaft journal 4 of the parking unit 3 and the motor shaft 37 can be achieved by means of shaft splines.

LIST OF REFERENCE NUMBERS 2 parking lock assembly
3 parking lock housing
4 shaft journal
5 ratchet wheel
6 locking element
7 actuator
8 base portion
9 through opening
10 bearing receptacle
11 receiving chamber
12 shaft bearing
13 cover portion
14 through opening
15 bearing receptacle
16 shaft bearing
17 shaft sealing ring
18 end
19 connecting means
20 portion
21 connecting elements
22 end
23 shaft seal
24 engagement recesses
25 locking teeth
26 functional face
27 pressure face
28 operating member
29 guiding sleeve
30 spring element
31 connecting profile
32 spindle shaft
33 spindle nut
34 spring
35 longitudinal groove
36 housing
37 driveshaft
38 housing portion
39 housing portion
40 electric drive assembly
41 electric drive
42 electric machine
43 reduction gearing
44 differential gearing
45 bearing
46 bearing
47 input gear
48 transmission shaft
49 bearing
50 bearing
51 electric connection
52 input gear
53 output gear
54 ring gear
55 differential carrier
56 differential gear set
57 bearing
58 bearing
59 differential gear
60 sideshaft gear
61 sideshaft gear
62 bearing
63 housing portion
64 housing portion
65 intermediate wall
66 intermediate wall
67 bearing receiving portion
68 bearing receiving portion
69 through opening
70 base
71 rotary pulse encoder
72 output shaft
73 output shaft
74 spur gear unit
75 planetary gear unit
76 gear stage
77 gear stage
78 clutch unit
79 actuator
80 through opening
A axis
D diameter
L length
R direction

The invention claimed is:

1. A parking lock unit for an electric drive assembly for driving a motor vehicle, comprising:
a parking lock housing comprising a base portion with a bearing receptacle and, at a base end, connecting elements for connecting the parking lock housing to a housing of the electric drive assembly;
a sleeve-shaped shaft journal which is rotatably supported in the first bearing receptacle about a rotational axis, wherein the shaft journal comprises a connecting profile for being connected to a driveshaft of the electric drive assembly in a rotationally fixed manner;
a ratchet wheel which is connected to the shaft journal in a rotationally fixed way and which is received in a receiving space between the base portion and a cover portion of the parking lock housing;
a locking element which is movably supported in the parking lock housing and which can be transferred into a locking position in which the locking element blocks a rotational movement of the ratchet wheel, and into a releasing position in which the locking element releases the ratchet wheel so that the ratchet wheel and the driveshaft connected thereto are freely rotatable;
a controllable actuator connected to the parking lock housing and configured to selectively transfer the locking element into the locking position or into the releasing position;
wherein a smallest inner diameter of the parking lock housing in the region of the ratchet wheel substantially corresponds to the largest outer diameter of the ratchet wheel.

2. The parking lock unit of claim 1,
wherein the smallest inner diameter of the parking lock housing in the region of the ratchet wheel is greater than a greatest outer diameter of the ratchet wheel and smaller than 1.3 times the greatest outer diameter of the ratchet wheel.

3. The parking lock unit of claim 1,
wherein the parking lock housing comprises an axial length which is smaller than 1.5 times an axial length of the shaft journal.

4. The parking lock unit of claim 1,
wherein the shaft journal for torque introduction comprises only the connecting profile for rotationally fixedly connecting to the output shaft of the electric drive assembly and the connection with the ratchet wheel.

5. The parking lock unit of claim 1,
wherein the cover portion comprises a through opening with a second bearing receptacle, wherein a cover-side end of the shaft journal axially extends into the through opening.

6. The parking lock unit of claim 1,
wherein an axially movable actuating member is provided, which is movable by the actuator into a first axial direction and which is loaded by a spring into a second direction opposite the first direction,
wherein the actuating member cooperates with the locking element in such a way that the actuating member, when moving in the first axial direction, releases the locking element and, when moving in the second axial direction, loads the locking element into the locking position.

7. An electric drive assembly for driving a motor vehicle, comprising:
a housing assembly;
an electric machine with a motor shaft provided in the form of a hollow shaft which is rotatably drivable around a rotational axis;
a reduction gearing which is configured to slow down a torque introduced by the motor shaft, wherein the reduction gearing comprises a transmission shaft which is offset relative to the motor shaft;
a differential gearing with a differential carrier and two output gears, wherein the differential gearing is configured to transmit a rotational movement introduced from the reduction gearing to the differential carrier to the two output gears;
a parking lock unit with a ratchet wheel, a locking element and a controllable actuator, wherein the ratchet wheel is arranged coaxially relative to the rotational axis and is connected to the motor shaft in a rotational fixed way, wherein the locking element cooperates with the ratchet wheel and is controllable by the actuator in a closing sense in order to inhibit a rotational movement of the ratchet wheel, and is controllable in an opening sense in order to release the ratchet wheel,
wherein the differential gearing and the parking lock unit are arranged on opposite sides of the electric machine.

8. Electric drive assembly according to claim 7,
wherein a first housing part of the housing assembly comprises at an end opposite to the differential gearing a base portion with a through opening, wherein the motor shaft extends through the through opening;
wherein the parking lock assembly comprises a parking lock housing with a connecting portion;
wherein the parking lock assembly is positioned on the base portion of the housing assembly from the outside and wherein the connecting portion of the parking lock housing is connected to the base portion of the housing assembly; and
wherein the ratchet wheel is connected to a shaft journal of the parking lock unit, which shaft journal is connected to the motor shaft of the electric machine in a rotationally fixed way.

9. Electric drive assembly according to claim 8,
wherein the shaft journal of the parking lock unit is connected to the motor shaft of the electric machine in a rotationally fixed way via a form-locking plug-in connection.

10. Electric drive assembly according to claim 8,
wherein the parking lock housing comprises a cover portion with a central through opening, wherein a shaft bearing is provided in the cover portion for rotatably supporting an output shaft connected to the differential gearing, and
wherein the shaft journal extends axially into the cover portion of the parking lock housing.

11. Electric drive assembly according to claim 7,
wherein a rotary pulse encoder is provided for sensing a rotational position of the electric machine, wherein the rotary pulse encoder is arranged in an annular receiving chamber formed between the base portion of the first housing part and a base portion of the parking lock assembly.

12. Electric drive assembly according to claim 7,
wherein the housing assembly comprises a second housing part in which the differential gearing is arranged, and an intermediate wall which is arranged between the first housing part and the second housing part,
wherein a first shaft bearing for the motor shaft and a second shaft bearing for the transmission shaft are received in the intermediate wall, wherein the motor shaft comprises a shaft portion connected to the rotor of the electric machine, a bearing portion rotatably supported in the intermediate wall, and a first input gear, wherein the first input gear projects freely into a receiving space formed behind the intermediate wall.

13. Electric drive assembly according to claim 12,
wherein an intermediate plate is provided between the intermediate wall and the second housing part, and wherein an annular channel is formed between the motor shaft and the output shaft extending through the motor shaft, with a first mouth facing the differential gearing and a second mouth remote from the differential gearing;
wherein the intermediate plate of the housing assembly comprises a through opening through which the output shaft extends, wherein an annular gap is formed between the output shaft and the intermediate plate through which lubricant can flow from the transmission chamber in which the differential gearing is received into the annular channel.

14. Electric drive assembly according to claim 13,
wherein the intermediate plate comprises a lubricant guiding geometry which is designed to guide lubricant into a mouth region of the first mouth of the annular channel, so that the lubricant can flow through the annular channel to the second mouth.

15. Electric drive assembly according to claim 8,
wherein the parking lock unit is designed as a pre-mountable unit which, with the ratchet wheel and the motor shaft being arranged coaxially, is positioned axially from outside on the base portion of the first housing part, in which the electric machine is received, and is connected thereto.

* * * * *